Sept. 17, 1946.   J. BOLSEY   2,407,917
RANGE FINDER
Original Filed Dec. 31, 1940

INVENTOR:
Jacques Bolsey
BY
*Michael S. _____*
   agent

Patented Sept. 17, 1946

2,407,917

UNITED STATES PATENT OFFICE 2,407,917

RANGE FINDER

Jacques Bolsey, New York, N. Y.

Substituted for abandoned application Serial No. 372,507, December 31, 1940. This application April 30, 1943, Serial No. 485,177

2 Claims. (Cl. 95—44)

This application is a substitute for abandoned application Serial No. 372,507, filed December 31, 1940.

My present invention relates to improvements in photographic and cinematographic cameras and more particularly to range finders combined with reflex cameras.

It is an object to combine a reflex camera with a built-in range finder arrangement.

In order to attain the above object I propose to combine with a reflex camera of the usual type a range finder arrangement with a reflecting member arranged in such a manner that the light beam is reflected through the reflex viewing chamber of the camera, using thus this chamber simultaneously for focusing and range finding.

Figure 3:
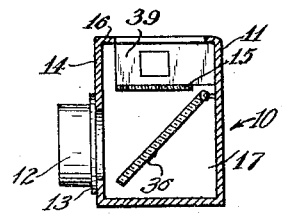
Figure 1:
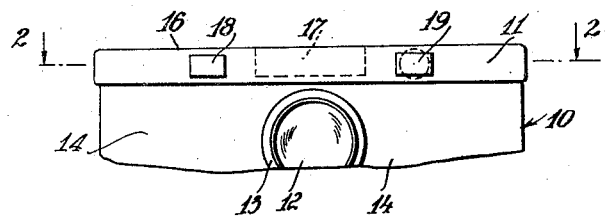
Figure 2:
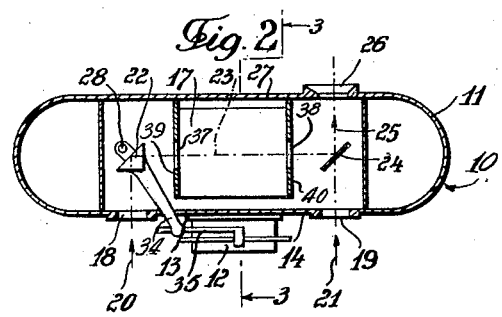

The novel features which I consider as characteristic for my invention are set forth in particular in the appended claims. The invention itself, however, both as to its construction and its method of operation, together with additional objects and advantages thereof will be best understood from the following description of specific embodiments, when read in connection with the accompanying drawings, in which:

Fig. 1 is a frontal view of the camera according to my invention;

Fig. 2 is a horizontal section through the camera shown in Fig. 1, along line 2—2 of Fig. 1; and Fig. 3 is a cross section through the camera shown in Figs. 1 and 2, along line 3—3 of Fig. 2.

As shown in Figs. 1–3, the reflex camera 10 comprises a camera casing 11, a camera lens 12, a lens mount 13 for lens 12 arranged on the front wall 14 of the camera casing 11, a translucent screen 15 for focusing purposes arranged parallel to the top wall 16 of casing 11, a central exposure and viewing chamber 17 in casing 11, and a tiltable focusing mirror 36 in this viewing chamber 17 adapted to reflect the light rays entering casing 11 through lens 12 on the translucent screen 15. All above enumerated elements are well-known, commonly used, parts of every reflex camera; their constructive details and mode of operation will, therefore, not be described in detail.

I combine with the above reflex camera a range finder arrangement comprising two openings 18 and 19 in the front wall 14 of casing 11 defining a horizontal base and adapted to accept two light beams 20 and 21 coming from the object to be photographed; the range finder arrangement further comprises a first reflecting member 22 arranged in casing 11 in the path of light beam 20 and reflecting this light beam inside of casing 11 parallel to wall 14, as indicated by numeral 23; a second reflecting member 24 is arranged at least partly in the path of light beam 21 and adapted to reflect light beam 23 substantially parallel to the path of light beam 21, as indicated by numeral 25; a viewing opening 26 is provided for in the rear wall 27 of the camera casing arranged in the path of light beam 21 and the twice reflected light beam 25.

As shown in Fig. 2, the reflected light beam 23 passes inside of casing 11 through the openings 37 and 38 in the walls 39 and 40, respectively, of the viewing chamber 17 parallel to the camera front wall 14 and translucent screen 15, crossing the path of the light rays reflected by the focusing mirror 36.

The reflecting mirror 22 reflects light beam 20 along path 23, as described above. This mirror is journalled turnably, as indicated by numeral 28, and provided with a lever arm 34 cooperating with a cam 35 mounted on the lens mount 13 or lens 12. Thus, lever 34 adjusts mirror 22 in accordance with the movement of lens 12.

Without further analysis, the foregoing will so fully reveal the gist of my invention that others can by applying current knowledge readily adapt it for various applications without omitting features that, from the standpoint of prior art, fairly constitute essential characteristics of the generic or specific aspects of this invention, and therefore such adaptations should and are intended to be comprehended within the meaning and range of equivalence of the following claims.

What I claim as new and desire to secure by Letters Patent is:

1. In a reflex camera a camera casing, a camera lens, a lens mount for said lens arranged on the front wall of said casing, a viewing chamber arranged in said casing and having side walls, aligned apertures in said side walls, a translucent screen for focusing purposes arranged within said viewing chamber parallel to the top wall of said casing, a focusing mirror in said viewing chamber adapted to reflect the light rays entering said casing through said camera lens on said translucent screen, two openings in the front wall of said casing defining a horizontal base and adapted to accept two light beams coming from the object to be photographed, a first reflecting member arranged inside of said casing in the path of the first of said light beams and reflecting it inside of said casing through said aligned apertures in said side walls of said viewing chamber and said viewing chamber itself along a path parallel to said camera front wall and said translucent screen crossing the path of the light rays reflected by said focusing mirror, a second reflecting member arranged at least partly in the path of the second of said light beams and adapted to reflect said reflected first light beam in a direction parallel to the path of said second light beam, a viewing opening in the rear wall of said camera casing arranged in the path of said second and said twice reflected first light beams, and means for adjusting said range finder in accordance with the position of said camera lens.

2. In a reflex camera a camera casing, a camera lens, a lens mount for said lens arranged on the front wall of said casing, a viewing chamber arranged in said casing and having side walls, aligned apertures in said side walls, a translucent screen for focusing purposes arranged within said viewing chamber parallel to the top wall of said casing, a focusing mirror in said viewing chamber adapted to reflect the light rays entering said casing through said camera lens on said translucent screen, two openings in the front wall of said casing defining a horizontal base and adapted to accept two light beams coming from the object to be photographed, a first reflecting member arranged inside of said casing in the path of the first of said light beams and reflecting it inside of said casing through said aligned apertures in said side walls of said viewing chamber along a path lying above said translucent screen parallel thereto and to said camera front wall crossing the path of the light rays reflected by said focusing mirror, a second reflecting member arranged at least partly in the path of the second of said light beams and adapted to reflect said reflected first light beam in a direction parallel to the path of said second light beam, a viewing opening in the rear wall of said camera casing arranged in the path of said second and said twice reflected first light beams, and means for adjusting said range finder in accordance with the position of said camera lens.

JACQUES BOLSEY.